United States Patent
Perry et al.

(10) Patent No.: US 12,301,287 B2
(45) Date of Patent: May 13, 2025

(54) LOSS OPTIMIZING ASYMMETRIC OPTICAL SPLITTER

(71) Applicant: AT&T Intellectual Property I, L.P., Atlanta, GA (US)

(72) Inventors: Ricky Perry, Cumming, GA (US); Stewart Barker, Lucas, TX (US); Julie Lorentzen, Dublin, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 242 days.

(21) Appl. No.: 17/986,866

(22) Filed: Nov. 14, 2022

(65) Prior Publication Data
US 2024/0162986 A1 May 16, 2024

(51) Int. Cl.
| | |
|---|---|
| G02B 6/02 | (2006.01) |
| G02B 6/028 | (2006.01) |
| G02B 6/26 | (2006.01) |
| H04B 10/2581 | (2013.01) |
| H04B 10/50 | (2013.01) |
| G02B 6/12 | (2006.01) |

(52) U.S. Cl.
CPC ..... H04B 10/2581 (2013.01); G02B 6/02047 (2013.01); G02B 6/0288 (2013.01); G02B 6/268 (2013.01); H04B 10/506 (2013.01); *G02B 6/02042* (2013.01); *G02B 2006/1215* (2013.01)

(58) Field of Classification Search
CPC ............ G02B 6/02042; G02B 6/02047; G02B 6/0288; G02B 6/268; G02B 2006/1215; H04B 10/2581; H04B 10/506
See application file for complete search history.

(56) References Cited

U.S. PATENT DOCUMENTS 9,306,670 B2 * 4/2016 Fujiwara .............. G02B 6/2808

OTHER PUBLICATIONS

Fujiwara, et al., "High-Splitting-Ratio PON Systems Using a PLC-Based Funnel-Shaped Waveguide With Dual-Mode Fiber [Invited]", IEEE/OSA Journal of Optical Communications and Networking, vol. 7, Issue 1, pp. A1-A6 (Year: 2015).*
Fujiwara et al., "Increasing splitting ratio of 10Gb s class PONs by using FW-DMF that acts as low loss splitter for upstream and conventional splitter for downstream", OFS, Mar. 2014, DOI: 10.1364/OFC.2014. U2C.5 (Year: 2014).*

(Continued)

*Primary Examiner* — Ryan A Lepisto

(57) ABSTRACT

An example apparatus may include an optical splitter apparatus that includes a dual mode fiber having a single mode fiber core embedded in a multi-mode fiber core, a plurality of single mode fibers, and a funnel waveguide coupling the dual mode fiber to the single mode fibers. The optical splitter apparatus may be for use in a passive optical network. The single mode fiber core may be for transmitting downstream optical signals, where the funnel waveguide distributes the downstream optical signals to the single mode fibers. In addition, the single mode fibers may transmit upstream optical signals, and the funnel waveguide may direct the upstream optical signals into the multi-mode fiber core. The optical splitter apparatus may have an asymmetric insertion loss ratio between the downstream optical signals received via the single mode fiber core and the upstream optical signals received via the single mode fibers.

14 Claims, 4 Drawing Sheets

(56) References Cited

OTHER PUBLICATIONS

H. Tanobe, M. Kobayashi, Y. Shibata, O. Moriwaki, R. Nagase and Y. Sakai, "Dual-Mode Fibre (DMF) capable of single- and multi-mode transmission," 33rd European Conference and Exhibition of Optical Communication, Berlin, Germany, 2007, pp. 1-2, doi: 10.1049/ic:20070405 (Year: 2007).*

Agiltron, "1×N-Single-Mode-PLC-Splitter", accessed from https://agiltron.com/product/single-mode-plc-splitters/ on Sep. 23, 2022, 2 pages.

Thorlabs, "2×2 Double-Clad-Fiber-Couplers", accessed from https://www.thorlabs.com/newgrouppage9.cfm?objectgroup_id=8400 on Nov. 6, 2022, 4 pages.

Thorlabs, "Double-Clad Fiber: 1250-1600 nm", DCF13, Spec Sheet, Apr. 2015, TTN041218-S01, Rev A, www.throlabsx.om/contact, 1 page.

Agiltron, "Double-Cladding-Fiber-Fused-Coupler" accessed from https://photonwares.com/category/fiber-optical-splitter-coupler/double-cladding-coupler/double-cladding-coupler/ on Nov. 6, 2022, 3 pages.

Thorlabs, "Double-Clad Fiber" accessed from https://www.thorlabs.com/newgrouppage9.cfm?objectgroup_id=8950 on Nov. 6, 2022, 3 pages.

Fujiwara et al., "Figure 2 from Increasing splitting ratio of 10Gb s class PONs by using FW-DMF that acts as low loss splitter for upstream and conventional splitter for downstream", Physicis, Mar. 2014, DOI: 10.1364/OFC.2014.TU2C.5, 2 pages.

Fujiwara, et al., Figure 5 from High-splitting-ratio-PON systems using a PLC based funnel shaped waveguide with dual mode fiber [invited], IEEE/OSA Journal of Optical Communications and Networking, 2015, 2 pages.

Fujiwara, et al., "High-Splitting-Ratio PON Systems Using a PLC-Based Funnel-Shaped Waveguide With Dual-Mode Fiber [Invited]", IEEE/OSA Journal of Optical Communications and Networking, vol. 7, Issue 1, pp. A1-A6, 2015.

OFS, "Multicore Optical Fiber", accessed from https://www.ofsoptics.com/multicore-optical-fiber/ on Nov. 5, 2022, 13 pages.

NICT, "Going beyond the Limits of Optical Fibers", National Institute of Information and Communications Technology, Apr. 14, 2025, accessed from https://www.nict.go.jp/en/press/2015/04/24-1.html.

* cited by examiner

| | UPSTREAM 1260-1330 nm | UPSTREAM 1600-1650 nm | DOWNSTREAM 1350-1360 & 1450-1600 nm | DOWNSTREAM 1600-1650 nm |
|---|---|---|---|---|
| Max Insertion Loss | | | | |
| 1:8 | (10.5-w) dB | (11.4-w) dB | (10.5+y) dB | (11.4+y) dB |
| 1:16 | (13.7-x) dB | (15.0-x) dB | (13.7+z) dB | (15.0+z) dB |
| Max Uniformity | | | | |
| 1:8 | 1.0 dB | 1.4 dB | 1.0 dB | 1.4 dB |
| 1:16 | 1.3 dB | 1.6 dB | 1.3 dB | 1.6 dB |
| Directivity | | | | |
| 1:8 | ≤ -55 dB | ≤ -55 dB | ≤ -55 dB | ≤ -55 dB |
| 1:16 | ≤ -55 dB | ≤ -55 dB | ≤ -55 dB | ≤ -55 dB |
| Return Loss | | | | |
| 1:8 | ≥ 55 dB | ≥ 55 dB | ≥ 55 dB | ≥ 55 dB |
| 1:16 | ≥ 55 dB | ≥ 55 dB | ≥ 55 dB | ≥ 55 dB |

200

210

LOSS OPTIMIZING ASYMMETRIC OPTICAL SPLITTER

The present disclosure relates generally to passive optical networks (PONs), and more particularly to asymmetric optical splitter apparatuses and methods for deploying and using such asymmetric optical splitter apparatuses.

BACKGROUND

Passive optical networks (PONs) are used primarily in connection with delivering high bandwidth to customer premises, such as in fiber to the home (FTTH)/fiber to the premises (FTTP), fiber to the curb (FTTC), or similar deployments. An optical line termination (OLT) transmits a downstream signal on a single optical fiber that is split via a passive splitter (or passive splitter/combiner) to a plurality of fibers coupled to a plurality of optical network units (ONUs). The downstream signals for different ONUs share the single optical fiber via time division multiplexing (TDM). Upstream optical signals from the ONUs are combined via the passive splitter/combiner, and may share the single optical fiber between the passive splitter/combiner and the OLT using time division multiple access (TDMA). Attempts at PON standardization are driven primarily by the International Telecommunication Union-Telecommunication Standardization Sector (ITU-T) and by the Institute of Electrical and Electronics Engineers (IEEE).

SUMMARY

In one example, the present disclosure describes an apparatus that may include an optical splitter apparatus, the optical splitter apparatus comprising a dual mode fiber comprising a single mode fiber core embedded in a multi-mode fiber core, a plurality of single mode fibers, and a funnel waveguide coupling the dual mode fiber to the plurality of single mode fibers. In one example, the optical splitter apparatus is for use in a passive optical network. In one example, the single mode fiber core of the dual mode fiber is for transmitting downstream optical signals, where the funnel waveguide distributes the downstream optical signals to the plurality of single mode fibers. In addition, in one example, the plurality of single mode fibers transmits upstream optical signals, and the funnel waveguide directs the upstream optical signals into the multi-mode fiber core. In one example, the optical splitter apparatus has an asymmetric insertion loss ratio between the downstream optical signals received via the single mode fiber core and the upstream optical signals received via the plurality of single mode fibers.

In one example, the present disclosure describes a method that may include deploying an optical splitter apparatus, the optical splitter apparatus comprising: a dual mode fiber comprising a single mode fiber core embedded in a multi-mode fiber core, a plurality of single mode fibers, and a funnel waveguide coupling the dual mode fiber to the plurality of single mode fibers, where the optical splitter apparatus is for use in a passive optical network. The method may further include transmitting downstream optical signals via the single mode fiber core of the dual mode fiber, where the funnel waveguide distributes the downstream optical signals to the plurality of single mode fibers, and receiving upstream optical signals via the multi-mode fiber core, where the upstream optical signals are input to the plurality of single mode fibers, where the funnel waveguide directs the upstream optical signals into the multi-mode fiber core, and where the optical splitter apparatus has an asymmetric insertion loss ratio between the downstream optical signals transmitted via the single mode fiber core and the upstream optical signals that are input to the plurality of single mode fibers.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
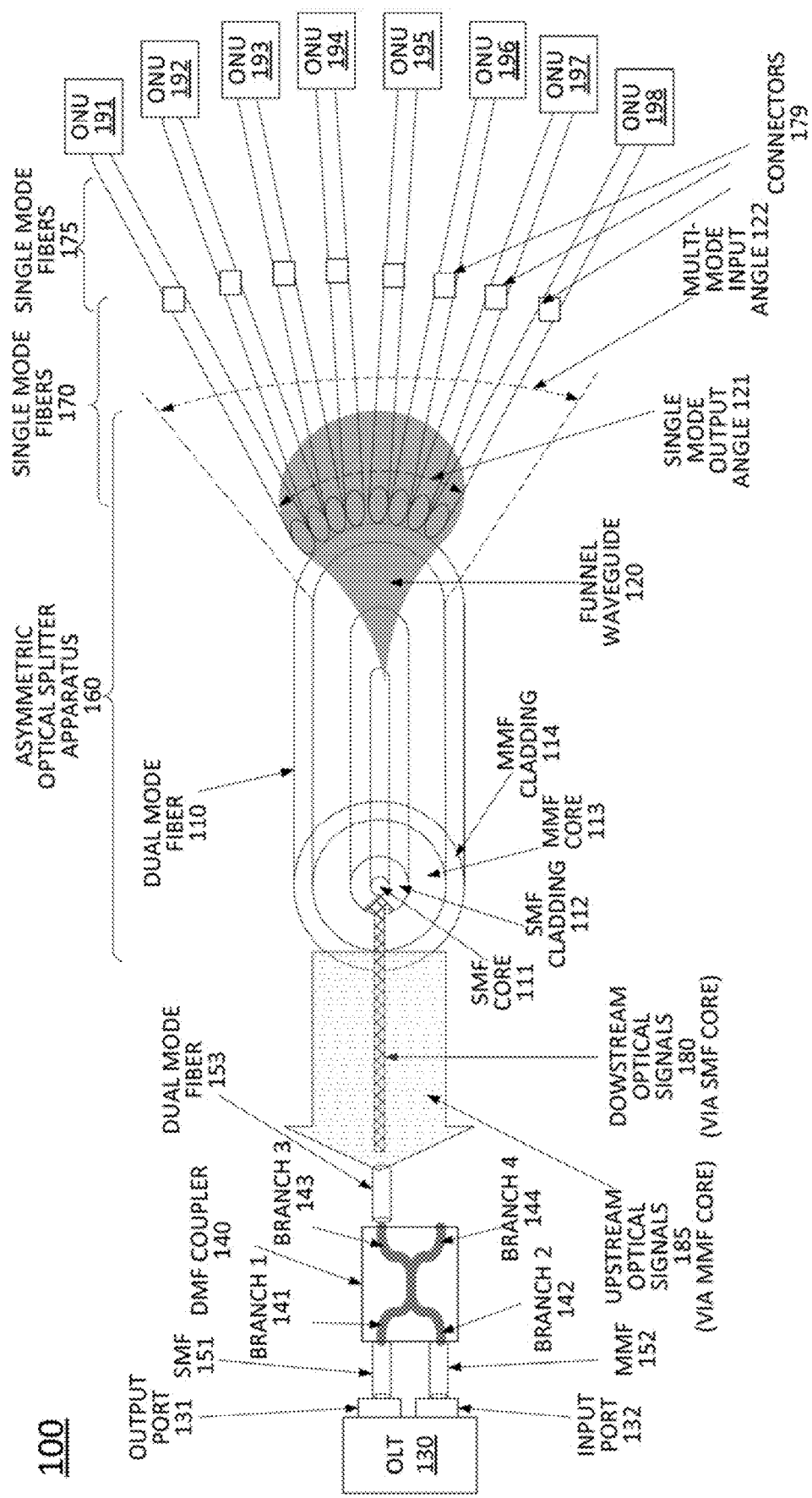
FIG. 1 illustrates a portion of an example passive optical network (PON), in accordance with the present disclosure.

Asymmetric optical splitter apparatuses and methods for deploying and using such asymmetric optical splitter apparatuses in passive optical networks are described. Notably, in a PON architecture, upstream transmission from ONUs is typically the weak link in increasing optical reach. The optical line termination (OLT) is optimized to be shared into many ratios for multiple optical network units (ONUs) (also referred to as optical network terminals (ONT)). A downstream optical signal is split and distributed as 1:4, 1:8, 1:16, 1:32, 1:64, etc. (depending on the distribution requirements) which is received by a plurality of ONTs. In addition, PON technology is generally designed around standards-based symmetric architectures in terms of the downstream (DS) and upstream (US) losses in the optical distribution network (ODN) (the PON between and including the OLT and the ONUs). Thus, upstream optical signals are sent back to the OLT through the same symmetric splitter (e.g., a splitter/combiner) having the same loss impact. This poses a problem when attempting to deploy a PON optical distribution network with higher powered OLT optics. Using higher power can increase the reach, thereby necessitating fewer central offices/etc. However, it may be impractical to similarly replace the ONT optics at customer premises with higher-powered optics due to the millions deployed. This becomes a limitation to advance the PON architecture to provide longer reach solutions.

In this regard, examples of the present disclosure leverage asymmetry to optimize the upstream optical signals (which, among other things, may increase reach). In particular, examples of the present disclosure describe a passive, asymmetric optical splitter apparatus (e.g., a splitter/combiner) that includes a funnel coupling to couple multiple single mode fibers into a multi-mode fiber core of a dual-mode fiber to create a splitter with asymmetric loss ratio (e.g., with a reduction in upstream loss, and a consequent higher loss for the downstream). Traditional outside plant infrastructure is deployed with single mode fiber (SMF). SMF has a smaller core diameter (e.g., 9 µm). On the other hand, multi-mode fiber MMF or dual-mode fiber (DMF) has a larger core diameter (e.g., 50 µm-250 µm). Notably, a dual-mode fiber may comprise a SMF core surrounded by cladding and embedded in a larger MMF core. In one example, the MMF core may comprise the "cladding" of the SMF core. In this regard, it should be noted that as referred to herein, a dual mode fiber may comprise a SMF core surrounded by a MMF core in a single fiber. A dual mode fiber may also be referred to as a double clad fiber.

In accordance with the present disclosure, an asymmetric optical splitter apparatus may comprise a dual-mode fiber coupled to multiple SMFs (e.g., one for each ONU/customer premises). By coupling multiple smaller SMFs into one larger MMF core of a dual-mode fiber, downstream optical signals may be transmitted by the OLT on a SMF (or the SMF core of a dual-mode fiber). The splitter may replicate the downstream optical signals to the multiple SMFs (e.g., for each ONU), similar to a conventional splitter, such as a planar light circuit (PLC), fused bi-conical taper (FBT) splitter, or the like. On the other hand, upstream optical signals may be transmitted by the ONUs on the respective SMFs. The asymmetric optical splitter apparatus may be configured to direct these signals returning to the OLT via the MMF core of the dual-mode fiber, thus having less loss. Coupling multiple SMF smaller cores into one larger MMF/DMF allows for the achievement of an asymmetric split loss ratio (it should be noted that in this case, the asymmetric is between the upstream and downstream, and not between the downstream signal copies for respective SMFs serving different ONUs).

Notably, in one example, any increase in loss for downstream optical signals (e.g., resulting from the asymmetry of the optical splitter) may be compensated by increasing the transmit power of the OLT. This increase in power is at a single component, versus increasing power of a plurality of ONUs/ONTs. As such, examples of the present disclosure enable the evolution of OLTs using higher power optics without the need to change the ONU/ONT power budget. This capability will allow the PON architecture to have a longer reach, thus serving more customers, or larger splits to allow more customer locations to be served per OLT (or per OLT transceiver). For instance, compared to a traditional symmetrical splitter (e.g., a PLC) upstream optical signal may return through the splitter on the MMF core with a reduced loss e.g., of 1 dB, 1.5 dB, 2 dB, or more. Downstream optical signals may enter the splitter on a SMF core with approximately 0-4 dB increased loss. However, downstream power is more easily increased and may therefore compensate (e.g., fully or at least partially) for this additional loss. These and other aspects of the present disclosure are described in greater detail below in connection with the examples of FIGS. 1-4.

To further aid in understanding the present disclosure, FIG. 1 illustrates an example apparatus, or system 100 of the present disclosure, e.g., at least a portion of a PON, or optical distribution network (ODN). As illustrated in FIG. 1, the system 100 may include an OLT 130, an asymmetric optical splitter apparatus 160, and a plurality of ONUs (or ONTs) 191-198. In this example, there are eight ONTs 191-198 served by a single OLT 130 via the asymmetric optical splitter apparatus 160. However, in other, further, and different examples, a different number of ONUs and/or splitter ports may be provided (e.g., a 1:4 splitter, a 1:8 splitter (such as illustrated in the example, of FIG. 1), a 1:16 splitter, a 1:32 splitter, etc.).

In accordance with the present disclosure, the asymmetric splitter apparatus 160 may include a dual mode fiber 110, a funnel waveguide 120, and a plurality of single mode fibers (SMFs) 170 (e.g., a "fan-out"). The SMFs 170 (e.g., SMF stubs) may be connected to SMFs 175 via respective connectors 179. The SMFs 175 may be coupled to the ONUs 191-198. It should be noted that the lengths of SMFs 170 and SMFs 175 are not to scale, and that the lengths of SMFs 175 may be substantially longer than the lengths of SMFs 170. The dual-mode fiber 110 (e.g., a fiber stub) may be connected to a dual mode fiber 153 (e.g., via a connector (not shown)). It should be noted that the lengths of dual mode fiber 110 and dual mode fiber 153 are not drawn to scale, and that the length of dual mode fiber 153 may be substantially longer than the dual mode fiber 110. As illustrated in FIG. 1, the dual mode fiber 110 may include a SMF core 111, an SMF cladding 112 surrounding the SMF core 111, a MMF core 113 surrounding the SMF core 111 and the SMF cladding 112, and a MMF cladding 114 surrounding all of the foregoing. It should be noted that although the SMF cladding 112 and MMF core 113 are illustrated as separate layers within the example dual mode fiber 110, in other, further, and different examples, the MMF core 113 may function as both a medium for conveyance of multi-mode optical signals as well as a cladding for the SMF core 111.

Downstream optical signals 180 may enter the asymmetric optical splitter apparatus 160 via the SMF core 111. Notably, the funnel waveguide 120 may distribute the downstream optical signals 180 to the SMFs 170 in accordance with the single mode output angle 121 for onward transmission via SMFs 175 to ONUs 191-198. In the reverse direction, upstream optical signals 185 may be transmitted by the ONUs 191-198 and received by the asymmetric optical splitter apparatus 160 via the SMFs 170. Notably, the funnel waveguide 120 directs the received upstream optical signals 185 into the MMF core 113, e.g., in accordance with the multi-mode input angle 122. It should also be noted that the downstream optical signals 180 may enter the asymmetric optical splitter apparatus 160 via the SMF core 111 with an insertion loss that is greater than an insertion loss for the upstream optical signals 185 entering the asymmetric optical splitter apparatus 160 via the SMFs 170. The asymmetry and the tuning thereof is further described in connection with the example table 200 of FIG. 2.

In the example of FIG. 1, dual mode fiber 110 of the asymmetric optical splitter apparatus 160 is coupled to dual mode fiber 153, where dual mode fiber 153 is further connected to a dual-mode fiber (DMF) coupler 140. The DMF coupler may include first branch (branch 1 (141)), which may comprise a single mode fiber (SMF), and a second branch (branch 2 (142)), which may comprise a multi-mode fiber (MMF). The third branch (branch 3 (143)) may comprise a dual mode fiber (DMF) that is coupled into the SMF and MMF (branches 1 and 2). The fourth branch (branch 4 (144)) may comprise a multi-mode fiber (MMF). However, in the present application, the fourth branch may remain unused. To illustrate, the downstream optical signals 180 may be transmitted via an output port 131 of the OLT 130 onto a single mode fiber 151. The single mode fiber 151 may be coupled to branch 1 (141) of the DMF coupler 140. Thus, the downstream optical signals 180 may enter branch 1 (141). The downstream optical signals 180 (single mode) may be directed via the DMF coupler 140 into a SMF core of the dual-mode fiber of branch 3 (143) (which may be further conveyed to dual mode fiber 153, dual mode fiber 110 of the asymmetric optical splitter apparatus 160, etc.). In the other direction, the upstream optical signals 185 (multimode) may exit the MMF core 113 of the dual mode fiber 110 into MMF core of dual mode fiber 153, which may be further input into a MMF core of branch 3 (143) of the DMF coupler 140. The DMF coupler 140 may direct these upstream optical signals 185 into branch 2 (142) (e.g., a MMF). Since branch 2 (142) is coupled to MMF 152, the upstream optical signals 185 may ultimately reach input port 132 for reception by the OLT 130.

It should be noted that in the present example, the output port 131 may comprise a single mode transmitter (or transceiver), and the input port 132 may comprise a multi-mode receiver (or transceiver). However, in another example, the OLT 130 may couple directly to a dual mode fiber (e.g., dual mode fiber 152). For instance, in another example, DMF coupler 140 may be incorporated into OLT 130. In still another example, DMF coupler 140 may be part of the asymmetric optical splitter apparatus 160. It should also be realized that other, further, and different examples may use a different component or technique for separating the single mode downstream and multi-mode upstream signals. For instance, in another example, a circulator may be used instead of a DMF coupler 140, and so forth. In one example, the OLT 130 may comprise a computing device or system, such as computing device 400 of FIG. 4 that is configured to perform one or more steps, functions, and/or operations as described herein (e.g., in accordance with the example method 300 of FIG. 3 for deploying and/or operating an asymmetric splitter apparatus in a passive optical network, described in greater detail below).

It should be noted that the system 100 has been simplified. Thus, the system 100 may be implemented in a different form than that which is illustrated in FIG. 1, or may be expanded by including additional ONUs, ONTs, single mode fibers, etc. without altering the scope of the present disclosure. In addition, system 100 may be altered to omit various elements, substitute elements for devices and/or apparatuses that perform the same or similar functions, combine elements that are illustrated as separate devices, and/or expand components of a single element into separate components that operate collectively as the respective element. In addition, although FIG. 1 is described and illustrated primarily in connection with a PON optical distribution network, in another example, one or more "active" components may be included in the system 100. For instance, nothing in the foregoing excludes that another example may comprise a repeater, amplifier, or the like, such as along a span of dual mode fiber 153 or MMF 152 for boosting the upstream optical signals 185. Thus, these and other modifications are all contemplated within the scope of the present disclosure.

Figure 2:
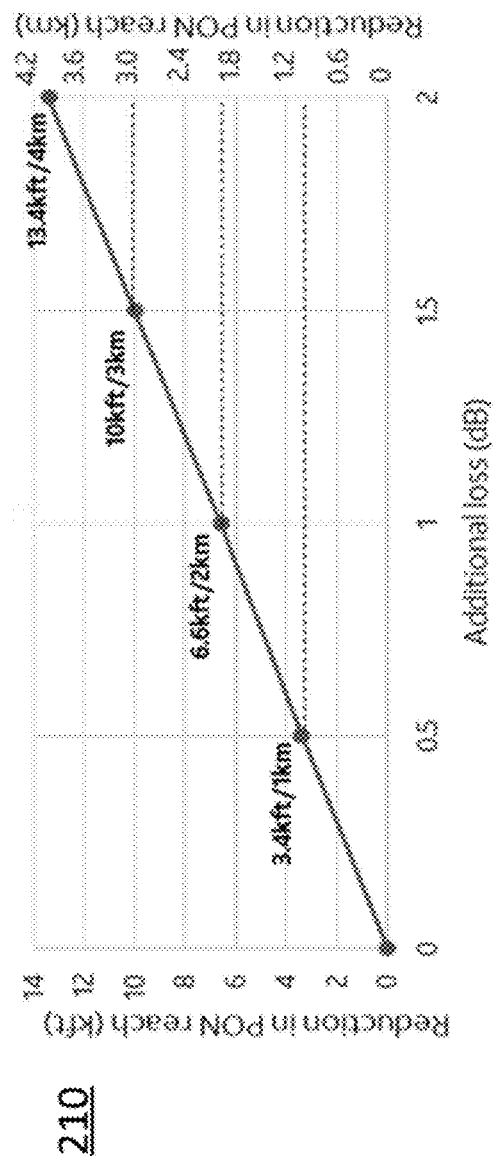
FIG. 2 illustrates a table of example upstream and downstream losses via an asymmetric splitter apparatus of the present disclosure and a graph of example reduction in reach versus additional loss.

To further aid in understanding the present disclosure, FIG. 2 illustrates an example table 200 with loss ratios/loss factors for upstream and downstream optical signals via an asymmetric optical splitter of the present disclosure and at various wavelength ranges/bands. Typically, when using conventional 1:N splitters, the maximum reach for a PON is limited by the upstream optical loss budget. PON reach can be maximized by use of asymmetric optical splitter, such as described herein, that reduces upstream loss while incurring a modest increase in downstream loss. Sample asymmetric loss ratios start from conventional 1:N specifications and then modify maximum insertion loss (by "w" or "x" upstream, and by "y" or "z" downstream) as illustrated in table 200. For instance, in a symmetric (conventional) 1:8 optical splitter, the insertion loss may be 10.5 dB for upstream optical signals at 1260-1330 nm and 10.5 dB for downstream optical signals at 1350-1360 nm or 1450-1600 nm. For 1600-1650 nm upstream and downstream, the insertion losses may each be 11.4 dB. This illustrates that the insertion loss generally increases for longer wavelengths. As further illustrated in the table 200, in a symmetric 1:16 configuration, the insertion loss may be 13.7 dB at for upstream optical signals at 1260-1330 nm and 13.7 dB for downstream optical signals at 1350-1360 nm or 1450-1600 nm. This illustrates that the insertion loss also typically increases approximately 3 dB (50 percent increase in loss) when doubling the split ratio. Table 200 illustrates further example loss parameters for uniformity (or "max uniformity"), which is the difference between maximum insertion loss and minimum insertion loss measured from input to output across all output ports on a splitter, directivity, which is a measure of crosstalk between output ports, and return loss, which is a relative measure of power reflected back to source.

For purposes of the present disclosure, the ratio of upstream insertion loss to downstream insertion loss is adjusted to create an asymmetric optical splitter (e.g., a splitter/combiner). For instance, for each decrease in "w" there may be a corresponding increase in "y." For example, if "w" is 1.5, for upstream at 1260-1330 nm and a 1:8 split ratio, the insertion loss may be 9 dB (a 1.5 dB reduction from a symmetric splitter with a 10.5 dB insertion loss for upstream signals at the same wavelength/band). On the other hand, the corresponding downstream insertion loss is 12 dB (an increase of 1.5 dB from a symmetric splitter with a 10.5 dB insertion loss for upstream signals at the same wavelength/band and same 1:8 split ratio). The result is a 3 dB difference in upstream and downstream insertion losses. However, the increased loss on the downstream versus a symmetric splitter is only 1.5 dB. As described above, this may be more easily compensated by increasing the transmit power (or upgrading an ONT with a single higher powered transmitter and/or transceiver). It should be noted that in this example, there is a one to one correspondence between "w" and "y." However, in another example, there may be a different relationships between "w" and "y." For instance, if "w" is 1 the resulting "y" may be "2," if "w" is 2, the resulting "y" may be "4," etc. In another example, the relationship may be non-linear. For instance, for linear increases in "w," "y" may increase exponentially, or the like. In any case, similar adjustments may result from changes in "w" (and corresponding changes in "y") in the 1600-1650 nm range. Likewise similar adjustments may result from changes in "x" (and corresponding changes in "z") for the listed wavelength(s) (e.g., ranges or bands) for 1:16 split ratios. A similar pattern may follow for split ratios of 1:32, 1:64, etc. (e.g., a baseline of 3 dB additional insertion loss as the split ratio doubles).

FIG. 2 further illustrates a graph 210 of example reduction in reach versus additional loss. For instance, an additional loss of 1.5 dB may reduce reach by 3 km (10,000 ft). As such, a reduction in upstream insertion loss (e.g., of 1.5 dB) may result in an increased reach of 3 km. While the reach for the downstream may be corresponding reduced in the absence of any other changes, as noted above, the transmit power may be more easily increased on the OLT for downstream optical signals. As such, the downstream reach may be brought into parity with the upstream reach (e.g., without changes to the more numerous ONUs/ONTs). It should be noted that the graph 210 illustrates an example of reduction in reach for a representative wavelength and fiber type. However, the same principles are equally applicable over other wavelengths and fiber types. For instance, longer wavelengths may achieve longer reaches, or "distance limits," while shorter wavelengths may be able to achieve lesser reaches/distance limits versus longer wavelengths. Likewise, multimode fiber may generally have shorter reaches/distance limits than single mode fiber at the same wavelength(s). In one example, the wavelength(s) for upstream and downstream optical signals, the properties of the optical fibers (e.g., distance limits, diameter, etc.), and other factors may be used to optimize placement of an asymmetric optical splitter in the optical distribution network (e.g., at a distance between the OLT and ONTs/ONUs). For instance, this may account for distance limits and losses over SMF and MMF between the OLT and asymmetric optical splitter (or between the OLT and a circulator, DMF coupler, or the like), distance limits and losses over DMF between the OLT and asymmetric optical splitter, and distance limits and losses over SMFs between the asymmetric optical splitter and the ONTs/ONUs. These and other aspects of the present disclosure are further discussed below in connection with the example method 300 of FIG. 3.

Figure 3:
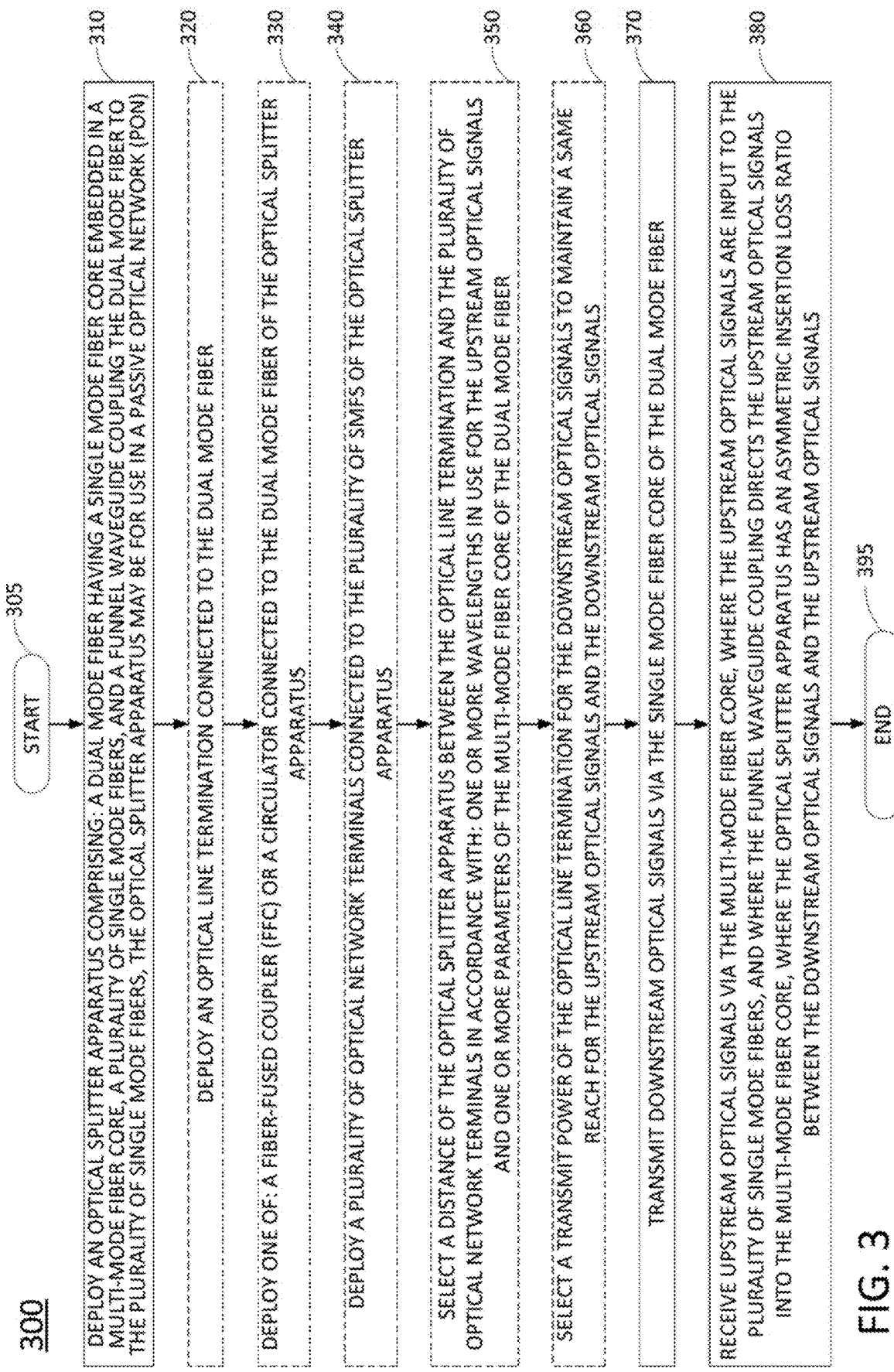
FIG. 3 illustrates a flowchart of an example method for deploying and/or operating an asymmetric splitter apparatus in a passive optical network, in accordance with the present disclosure.

FIG. 3 illustrates a flowchart of an example method 300 for deploying and/or operating an asymmetric splitter apparatus in a passive optical network. In one example, one or more of the steps, functions, or operations of method 300 may be performed by a computing device or system 400, and/or processor 402 as described in connection with FIG. 4 below. For instance, the computing device or system 400 may represent any one or more components of a server that is/are configured to perform steps, functions and/or operations of the method 300. Similarly, in one example, one or more steps, functions, or operations of the method 300 may be performed by a processing system comprising one or more computing devices collectively configured to perform various steps, functions, and/or operations of the method 300. For instance, multiple instances of the computing device or processing system 400 may collectively function as a processing system. The method 300 begins in step 305 and proceeds to step 310.

At step 310, the method may include deploying an optical splitter apparatus, the optical splitter apparatus comprising: a dual mode fiber comprising a single mode fiber core embedded in a multi-mode fiber core, a plurality of single mode fibers, and a funnel waveguide coupling the dual mode fiber to the plurality of single mode fibers (e.g., such as the example asymmetric optical splitter apparatus 160 of FIG. 1). For instance, the optical splitter apparatus may be for use in a passive optical network (PON). In other words, step 310 may comprise deploying the optical splitter apparatus in the PON (e.g., in a passive optical distribution network (ODN)).

At optional step 320, the method may include deploying an optical line termination (OLT) connected to the dual mode fiber. Thus, in one example, the PON/ODN may include an optical line termination connected to the dual mode fiber. In one example, the OLT may be connected to a DMF of a longer span, which connects to the DMF of the optical splitter apparatus. Thus, the OLT may be connected to the DMF of the optical splitter apparatus insofar as the OLT may transmit and receive optical signals via the DMF of the optical splitter apparatus. In another example, the OLT may be connected directly to the DMF of the optical splitter apparatus.

At optional step 330 the method may include deploying one of: a fiber-fused coupler (FFC) or a circulator connected to the dual mode fiber of the optical splitter apparatus (e.g., directly or via an additional span of dual mode fiber between the fiber-fused coupler or the circulator and the dual mode fiber of the optical splitter apparatus). In accordance with the present disclosure, the fiber-fused coupler or the circulator may comprise a single mode fiber branch for feeding the downstream optical signals into the single mode fiber core of the dual mode fiber of the optical splitter apparatus (and in one example, via an additional span of DMF), and a multi-mode fiber branch for receiving the upstream optical signals from the multi-mode fiber core of the dual mode fiber (and in example, from the additional span of DMF). In one example, the single mode fiber branch may be connected to a transmit port of the OLT and the multi-mode fiber branch may be connected to a receive port of the OLT (e.g., directly, or via respective additional spans of SMF and MMF). Thus, in one example, the PON/ODN may include a FFC, circulator, or the like connected to the dual mode fiber of the optical splitter apparatus and to the input and output ports (transmit and receive portions) of the OLT.

At optional step 340, the method may include deploying a plurality of optical network terminals (ONTs, also referred to herein as ONUs) connected to the plurality of SMFs of the optical splitter apparatus. In one example, the ONTs may be connected directly to the plurality of SMFs of the optical splitter apparatus. In another example, the plurality of SMFs of the optical splitter apparatus may be connected to additional SMFs of a longer span, which connect to the respective ONTs. Thus, in one example, the PON/ODN may include the ONTs connected to the respective plurality of SMFs.

At optional step 350, the method may include selecting a distance of the optical splitter apparatus between the optical line termination and the plurality of optical network terminals in accordance with: one or more wavelengths in use for the upstream optical signals and one or more parameters of the multi-mode fiber core of the dual mode fiber. In one example, the one or more parameters may include a distance limit of the MMF core of the DMF (e.g., for either or both of the DMF of the optical splitter apparatus, or another span of DMF that connects the DMF of the optical splitter apparatus to upstream components (such as the ONT and/or the FFC or circulator)), and/or the MMF core diameter, etc. For instance, step 350 may include maximize a length of a DMF connected to the DMF of the optical splitter apparatus up to a distance limit (e.g., if distance(s) to ONT(s)/ONU(s) exceed(s) the distance limit of MMF core of the dual mode fiber). For instance, the method may include deploying a 2000 meter run of DMF to the optical splitter apparatus and then a plurality of SMFs for the remainder of the distance(s) between the optical splitter apparatus and the ONTs. In one example, the selection of the distance may be further based on a specified achievable data rate (e.g., 10G vs. 40G, etc.). For instance, the MMF core of the dual mode fiber may have a longer distance limit if only 10G is attempted to be achieved versus 40G. In one example, the distance may be further optimized for the wavelengths being used. In one example, the distance may be further optimized based on an overall cost of the PON/ODN from the OLT to the ONTs. For example, longer runs of SMF may be used where the asymmetric optical splitter is closer to the OLT, while longer runs of dual mode fiber and/or SMF plus MMF may be used when the optical splitter apparatus is closer to the ONTs. It should again be noted that examples of the present disclosure may also provide for an increased reach, as compared to not using the optical splitter apparatus as described herein.

At optional step 360, the method may include selecting a transmit power of the optical line termination for the downstream optical signals to maintain a same reach for the upstream optical signals and the downstream optical signals (e.g., substantially a same reach over wavelengths in use/to be used). In one example, step 360 may include selecting a transmit power to overcome an additional insertion loss as a consequence of the asymmetry of the optical splitter apparatus. For instance, a transmit power of the optical line termination for the downstream optical signals may be increased in correspondence to a difference between: a downstream insertion loss at a transmit wavelength of the downstream optical signals in accordance with the asymmetric insertion loss ratio and a downstream insertion loss that would otherwise be exhibited in accordance with a symmetric insertion loss ratio. In addition, downstream insertion loss may be higher for longer wavelengths (e.g., 1600-1650 nm) than for shorter wavelengths (e.g., 1350-1360 nm or 1450-1600 nm). Thus, in one example, rather than compensating power based on the average insertion loss for downstream, optional step 360 may include compensating for insertion losses at specific wavelength(s) being used for downstream transmission.

At step 370, the method may include transmitting downstream optical signals via the single mode fiber core of the dual mode fiber. In addition, the funnel waveguide coupling may distribute the downstream optical signals to the plurality of single mode fibers. For instance, the transmitting may be initiated by the OLT. In one example, the OLT may transmit via a single mode transmitter or transceiver. In one example, the transmitting may be in accordance with the transmit power that may be selected at optional step 360.

At step 380, the method may include receiving upstream optical signals via the multi-mode fiber core, where the upstream optical signals are input to the plurality of single mode fibers, and where the funnel waveguide coupling directs the upstream optical signals into the multi-mode fiber core. In one example, the optical splitter apparatus has an asymmetric insertion loss ratio between the downstream optical signals transmitted via the single mode fiber core and the upstream optical signals that are input to the plurality of single mode fibers. For instance, the asymmetric insertion loss ratio may comprise an average upstream insertion loss of at least 1 dB less than an average downstream insertion loss over a plurality of wavelengths in use in the PON. In one example, the average upstream insertion loss may be at least 1.5 dB less than the average downstream insertion loss.

Following step 380, the method 300 proceeds to step 395 where the method ends.

It should be noted that the method 300 may be expanded to include additional steps, or may be modified to replace steps with different steps, to combine steps, to omit steps, to perform steps in a different order, and so forth. For instance, in one example optional steps 320 and 340 may precede step 310. For example, a PON/ODN may already have been deployed, but may be modified/upgraded to include an asymmetric optical splitter apparatus (and/or one or more additional components, such as a FFC or circulator, etc.). In one example, a new OLT may be deployed, but existing ONTs/ONUs may remain in use. Thus, optional step 340 may be omitted, or may precede all other steps, and so on. Similarly, in one example, optional steps 350 and/or 360 may precede the deployment of one or more components of step 310 or of optional steps 320-340. For instance, the transmit power and/or optical splitter apparatus distance/location may be modeled in advance and then deployed and implemented in accordance with the transmit power and/or distance/location selected. In one example, the method 300 may be expanded or modified to include steps, functions, and/or operations, or other features described above in connection with the example(s) of FIGS. 1 and 2, or as described elsewhere herein. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

Figure 4:
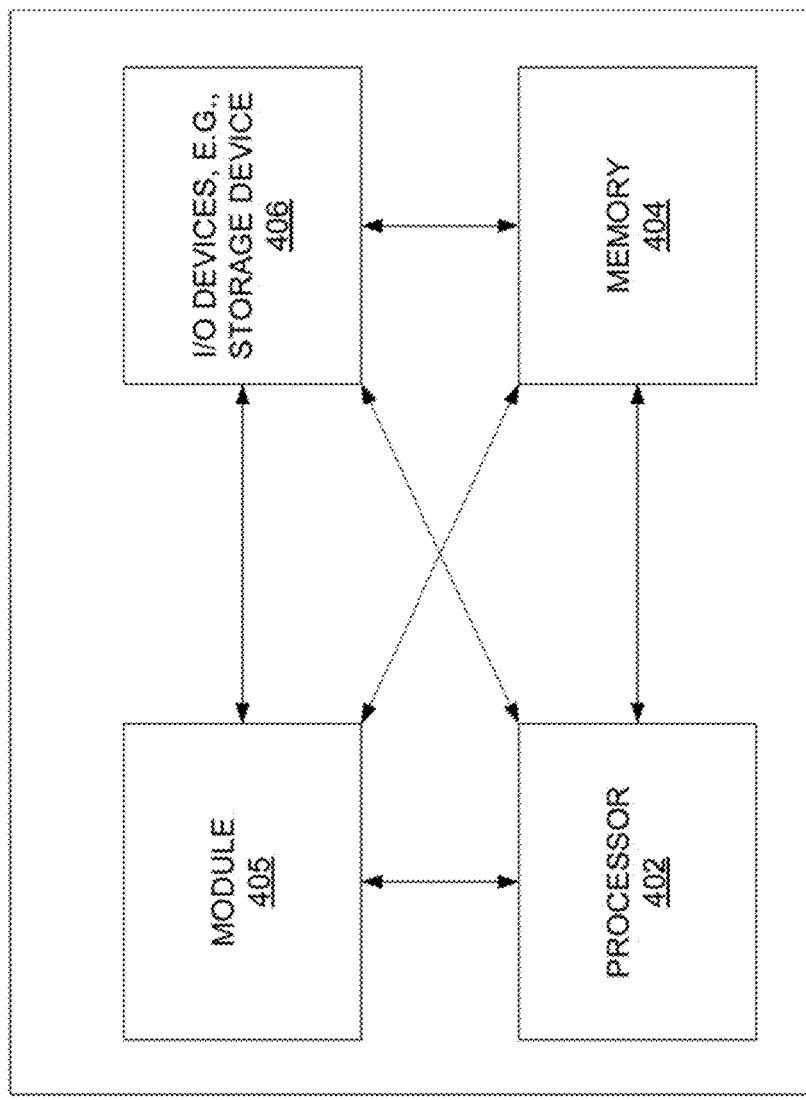
FIG. 4 illustrates a high level block diagram of a computing device specifically programmed to perform the steps, functions, blocks and/or operations described herein.

FIG. 4 depicts a high-level block diagram of a computing system 400 (e.g., a computing device or processing system) specifically programmed to perform one or more of the functions described herein. For example, any one or more steps, functions, and/or operations described and illustrated in connection with FIG. 3, or elsewhere in the present disclosure may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where the hardware processor element 402 may also represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for deploying and/or operating an asymmetric splitter apparatus in a passive optical network, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like). In accordance with the present disclosure, the input/output devices 406 may further include one or more optical transmitters, receivers, and/or transceivers.

Although only one hardware processor element 402 is shown, the computing system 400 may employ a plurality of hardware processor elements. Furthermore, although only one computing device is shown in FIG. 4, if the method(s) as discussed above is implemented in a distributed or parallel manner for a particular illustrative example, e.g., the steps of the above method(s) or the entire method(s) are implemented across multiple or parallel computing devices, then the computing system 400 of FIG. 4 may represent each of those multiple or parallel computing devices. Furthermore, one or more hardware processor elements (e.g., hardware processor element 402) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 405 for deploying and/or operating an asymmetric splitter apparatus in a passive optical network (e.g., a software program comprising computer-executable instructions) can be loaded into memory 404 and executed by hardware processor element 402 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 402) executing the computer-readable instructions relating to the above described method(s) can be perceived as a programmed processor or a specialized processor. As such, the present module 405 for deploying and/or operating an asymmetric splitter apparatus in a passive optical network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. An apparatus comprising:
an optical splitter apparatus, the optical splitter apparatus comprising:
a dual mode fiber comprising a single mode fiber core embedded in a multi-mode fiber core;
a plurality of single mode fibers; and
a funnel waveguide coupling the dual mode fiber to the plurality of single mode fibers, wherein the optical splitter apparatus is for use in a passive optical network, wherein the single mode fiber core of the dual mode fiber is for transmitting downstream optical signals, wherein the funnel waveguide distributes the downstream optical signals to the plurality of single mode fibers, wherein the plurality of single mode fibers transmits upstream optical signals, wherein the funnel waveguide directs the upstream optical signals into the multi-mode fiber core, and the wherein the optical splitter apparatus has an asymmetric insertion loss ratio between the downstream optical signals received via the single mode fiber core and the upstream optical signals received via the plurality of single mode fibers, wherein the asymmetric insertion loss ratio comprises an average upstream insertion loss of at least 1 dB less than an average downstream insertion loss over a plurality of wavelengths in use in the passive optical network;
an optical line termination coupled to the dual mode fiber; and
a circulator coupled to the dual mode fiber, wherein the circulator comprises:
a single mode fiber branch for feeding the downstream optical signals into the single mode fiber core of the dual mode fiber; and
a multi-mode fiber branch for receiving the upstream optical signals from the multi-mode fiber core of the dual mode fiber.

2. The apparatus of claim 1, wherein the average upstream insertion loss is at least 1.5 dB less than the average downstream insertion loss.

3. The apparatus of claim 1, wherein a transmit power of the optical line termination for the downstream optical signals is increased in correspondence to a difference between the average downstream insertion loss and a downstream insertion loss in accordance with a symmetric insertion loss ratio.

4. The apparatus of claim 1, wherein a transmit power of the optical line termination for the downstream optical signals is increased in correspondence to a difference between a downstream insertion loss at a transmit wavelength of the downstream optical signals in accordance with the asymmetric insertion loss ratio and a downstream insertion loss in accordance with a symmetric insertion loss ratio.

5. The apparatus of claim 1, wherein a transmit power of the optical line termination for the downstream optical signals is selected to maintain a same reach for the upstream optical signals and the downstream optical signals.

6. The apparatus of claim 1, wherein the single mode fiber branch is connected to a transmit port of the optical line termination, and wherein the multi-mode fiber branch is connected to a receive portion of the optical line termination.

7. The apparatus of claim 1, further comprising:
a fiber-fused coupler coupled to the dual mode fiber, wherein the circulator comprises:
a single mode fiber branch for feeding the downstream optical signals into the single mode fiber core of the dual mode fiber; and
a multi-mode fiber branch for receiving the upstream optical signals from the multi-mode fiber core of the dual mode fiber.

8. The apparatus of claim 7, wherein the single mode fiber branch is connected to a transmit port of the optical line termination, and wherein the multi-mode fiber branch is connected to a receive port of the optical line termination.

9. The apparatus of claim 1, wherein each of the plurality of single mode fibers is coupled to a respective one of a plurality of optical network terminals.

10. The apparatus of claim 9, wherein a distance of the optical splitter apparatus is selected between the optical line termination and the plurality of optical network terminals in accordance with one or more wavelengths in use for the upstream optical signals and one or more parameters of the multi-mode fiber core of the dual mode fiber.

11. A method comprising:
deploying an optical splitter apparatus, the optical splitter apparatus comprising:
a dual mode fiber comprising a single mode fiber core embedded in a multi-mode fiber core;
a plurality of single mode fibers; and
a funnel waveguide coupling the dual mode fiber to the plurality of single mode fibers, wherein the optical splitter apparatus is for use in a passive optical network;
transmitting downstream optical signals via the single mode fiber core of the dual mode fiber, wherein the funnel waveguide distributes the downstream optical signals to the plurality of single mode fibers;
receiving upstream optical signals via the multi-mode fiber core, wherein the upstream optical signals are input to the plurality of single mode fibers, wherein the funnel waveguide directs the upstream optical signals into the multi-mode fiber core, and wherein the optical splitter apparatus has an asymmetric insertion loss ratio between the downstream optical signals transmitted via the single mode fiber core and the upstream optical signals that are input to the plurality of single mode fibers, wherein the asymmetric insertion loss ratio comprises an average upstream insertion loss of at least 1 dB less than an average downstream insertion loss over a plurality of wavelengths in use in the passive optical network, wherein an optical line termination is coupled to the dual mode fiber; and
deploying one of: a fiber-fused coupler or a circulator coupled to the dual mode fiber, wherein the fiber-fused coupler or the circulator comprises:
a single mode fiber branch for feeding the downstream optical signals into the single mode fiber core of the dual mode fiber; and
a multi-mode fiber branch for receiving the upstream optical signals from the multi-mode fiber core of the dual mode fiber, wherein the single mode fiber branch is connected to a transmit port of the optical line termination, and wherein the multi-mode fiber branch is connected to a receive port of the optical line termination.

12. The method of claim 11, further comprising:
selecting a transmit power of the optical line termination for the downstream optical signals to maintain a same reach for the upstream optical signals and the downstream optical signals.

13. The method of claim 11, wherein each of the plurality of single mode fibers is coupled to a respective one of a plurality of optical network terminals.

14. The method of claim 13, further comprising:
selecting a distance of the optical splitter apparatus between the optical line termination and the plurality of optical network terminals in accordance with one or more wavelengths in use for the upstream optical signals and one or more parameters of the multi-mode fiber core of the dual mode fiber.

* * * * *